United States Patent [19]
Das et al.

[11] Patent Number: 5,317,524
[45] Date of Patent: May 31, 1994

[54] SPECTRAL SIGNAL ANALYZER SYSTEM

[75] Inventors: Promit Das; Terrance R. Kinney, both of South Bend, Ind.

[73] Assignee: Allied-Signal Inc., Morristown, N.J.

[21] Appl. No.: 762,837

[22] Filed: Sep. 19, 1991

[51] Int. Cl.$^5$ .............................................. G01K 7/02
[52] U.S. Cl. ..................... 364/557; 364/484; 364/485; 364/726; 364/827; 250/227.17; 250/227.18; 250/227.21; 250/227.23
[58] Field of Search ............... 364/557, 484, 485, 726, 364/827; 250/474.1, 227.17, 227.18, 227.21, 227.23

[56] References Cited

U.S. PATENT DOCUMENTS

| | | | |
|---|---|---|---|
| 3,573,446 | 4/1971 | Bergland | 364/726 |
| 3,700,801 | 10/1972 | Dougherty | 364/827 |
| 4,139,897 | 2/1979 | Gardner et al. | 364/827 |
| 4,785,251 | 11/1988 | Akiyama et al. | 364/484 |
| 4,857,726 | 8/1989 | Kinney et al. | 250/227.23 |
| 4,901,244 | 2/1990 | Szeto | 364/484 |
| 4,928,005 | 5/1990 | Lefevre et al. | 250/227.23 |
| 4,970,385 | 11/1990 | Tatsuno et al. | 250/227.17 |
| 5,004,910 | 4/1991 | Arnett | 250/227.23 |

Primary Examiner—Jack B. Harvey
Assistant Examiner—Hal D. Wachsman
Attorney, Agent, or Firm—Leo H. McCormick, Jr.; Larry J. Palguta; Robert A. Walsh

[57] ABSTRACT

A process for analyzing a spectral signal generated by a birefringent element and transmitted to an array. An output spectral signal emanating from the array is converted from an analog to a digital signal to establish a reference wave form which has a dominant frequency after the birefringent element is exposed to a known temperature. Thereafter, a current wave form is generated from the output spectral signal emanating from the array. A phase and frequency relationship is obtained by cross correlating the current wave form and the reference wave form. The dominant frequency for the phase and frequency relationship is obtained by Fast Fourier Transformation. Thereafter, the dominant frequency for the phase and frequency relationship of the current wave form is compared with the dominant frequency for the reference wave form to determine a temperature range. The temperature range and phase and dominant frequency for the current wave form are matched with a reference schedule stored in the memory of a digital signal processor to predict the current temperature experienced by the birefringent element. This predicted temperature is displayed on a screen to inform an operator of the current operational conditions experienced by the birefringent element.

8 Claims, 2 Drawing Sheets

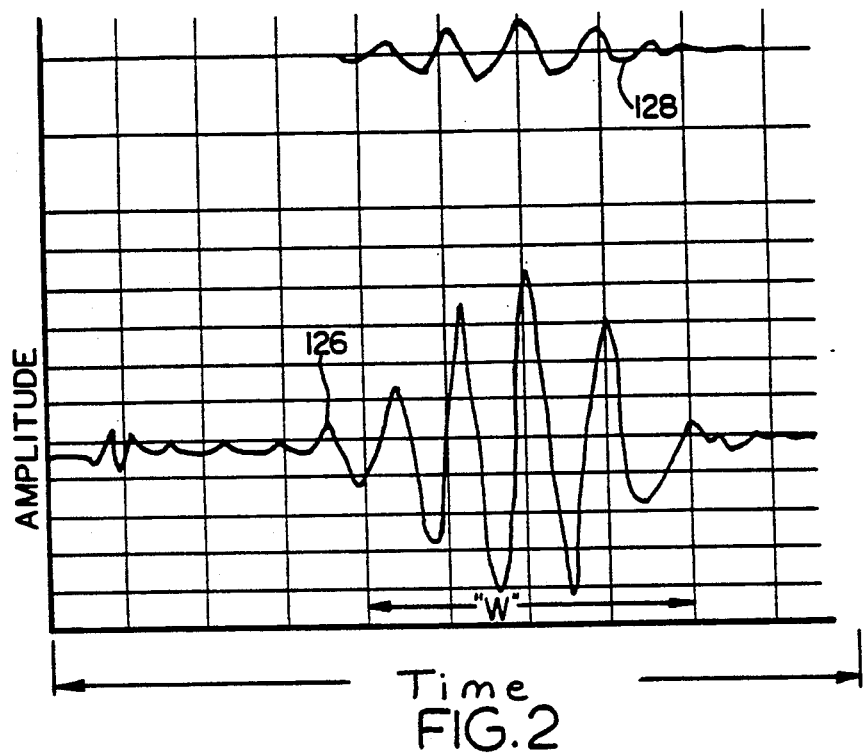
FIG.2
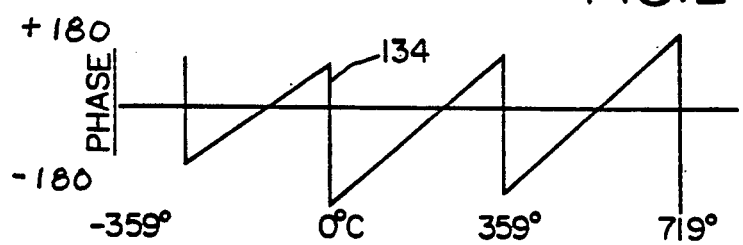
FIG.3
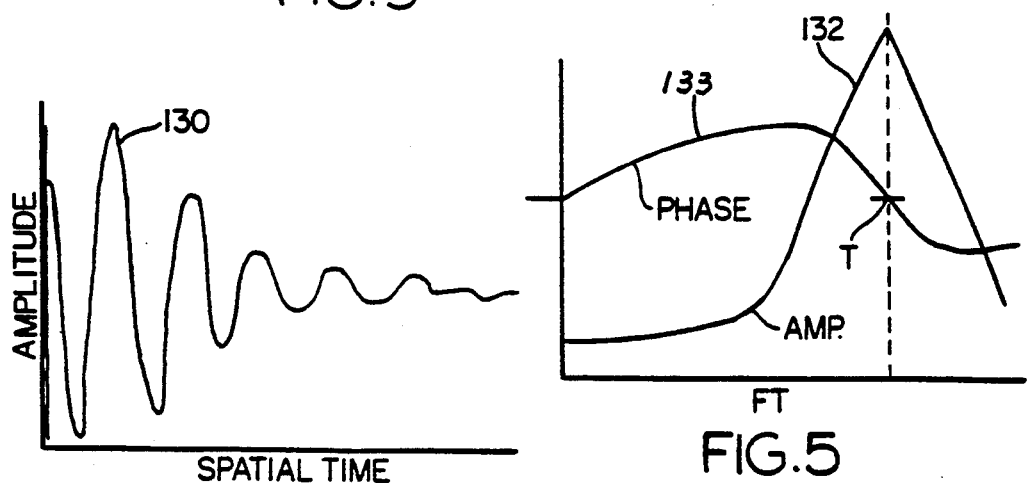
FIG.4
FIG.5

SPECTRAL SIGNAL ANALYZER SYSTEM

This invention relates to a processing system for analyzing a spectral signal generated by exposing a birefringent sensor to a temperature to create a current wave form which is matched with a reference wave form to inform an operator of the temperature experienced by the birefringent sensor.

Strategically located electrical transducers sense many conditions during the operation of an aircraft to control and maintain the operation of a turbine within set specifications. These transducers are interconnected to a central control by bundles of copper wire. Although these bundles are shielded, the signals carried on the copper wire may be influenced by electromagnetic interference and electromagnetic pulse. In order to reduce electromagnetic interference and electromagnetic pulse the cables are shielded. However, such shielding can add considerable weight to the airframe. In order to eliminate the effect of electromagnetic interference and electromagnetic pulse, fiber optic sensors and cables have been introduced to replace the electrical sensor and copper cables.

The selection of a fiber optic sensor to meet the operational temperature requirements of an aircraft has resulted in the evaluation of many materials to meet the operational temperature and pressure conditions experienced during the operation of an aircraft. One such material for use as a temperature sensor is a fluorescent material. The luminescent decay time for a fluorescent material can be used to generate a signal corresponding to the temperature in a hostile environment such as created in the combustion chamber of a turbine engine. U.S. Pat. No. 5,036,194 discloses a cable for the transmission of such a signal to a processor. The accuracy of the sensed temperature, which is directly dependent on the processing of the signal from the sensors, requires special decoding techniques, such as disclosed in U.S. Pat. No. 5,004,910. This type of sensor functions in an adequate manner when the temperature required to be sensed is in the range of from 100° to 400° C. However the temperature in a combustion chamber of a turbine engine can reach 1100° C.

It is suggested in U.S. Pat. Nos. 4,140,393 and 4,928,005 that temperature dependent birefringent sensor materials could be used as a sensor material to evaluate temperature changes. U.S. Pat. No. 4,928,005 indicates that a temperature between −100° to +300° C. can be measured by analyzing deviations of modulated signals generated by light Passing through coupling points. This induced modification created by light passing through coupling points along the communication cable may be adequate for some applications where dynamic forces are not applied to the cable, however in an airframe the introduction of G forces may eventually cause the cable to rupture or crack which would adversely effect the signal transmission.

Copending U.S. patent application Ser. No. 796,743, discloses a sensor system using a the birefringent properties of crystals of lanthanum beryllate (BEL) to measure temperature and stress in an environment having a temperature range of from −200° to +1500° C. In this sensor system, an optic excitation signal generated by a light emitting diode in an opto-electronic interface is transmitted to a remote detector by a first optical fiber conductor. The optic excitation signal is then spectrally modulated by the sensor as a function of the temperature and uniaxial stress in the sensor's active element. The modulation of the signal resembles a fringe pattern which is caused by constructive and destuctive interference of the optic excitation signal. The multiple period spectrally modulated optic signal is transmitted from the sensor to the opto-electronic interface by a second optical fiber conductor. The opto-electronic interface initially spectrally disperses the optic signal and then images the dispersed optic signal onto a charge couple device (CCD) array to produce an electrical signal output. The signal spectral output of the CCD array whose amplitude with respect to time relates to the optic intensity with respect to wavelength.

In the invention disclosed herein, we have developed a technique for processing the signal spectral output of a CCD array to measure the temperature of the environment in which the active element of the sensor is located or exposed within an accuracy of ±1.0° C. over a range of −200° to +1500° C.

In this technique, the signal output is converted from an analog to a digital signal to establish a preface wave form when the birefringent sensor is exposed to known temperature. A Fast Fourier Transformation is performed on the preface wave form to determine its dominant frequency. The reference wave form and its dominant frequency are stored in the memory of a digital signal Processor. Thereafter, the birefringent sensor is exposed to an unknown temperature to develop a current spectral output signal. The current spectral output signal is converted from an analog to a digital signal to establish a current wave form. The phase and dominant frequency relationship between the current wave form and the reference wave form are is obtained by combination of cross correlation and thereafter, a Fast Fourier Transformation. The current dominant frequency is compared with the reference dominant frequency to determine a temperature range. When the temperature range and phase are matched with a reference table in the digital signal processor, a signal representing the current temperature of the birefringent sensor is stored in the memory of the digital signal processor. Periodically the memory is read by a host computer and displayed on a screen to continually observe changes in temperature experienced by the birefringent sensor.

It is an object of this invention to provide a process for analyzing a spectral signal generated by a birefringent temperature sensor and transmitted to an array to obtain a continuous indication of changes in temperature experienced by the birefringent sensor.

It is a further object of this invention to provide a system of processing an output signal from a spectral array which uses both phase and frequency information obtained by analyzing a fringe pattern created by a birefringent sensor to predict the temperature of the environment of the birefringent sensor.

It is an object of this invention to provide a system of analyzing a spectral signal by obtaining a dominant frequency generated by a fringe pattern through the use of cross-correlation and Fast Fourier Transformation and matching the resultant dominant frequency with a reference schedule to obtain the current temperature.

These objects and the advantages obtained thereby should be apparent from reading this specification while viewing the drawings wherein:

FIG. 2 is a graph illustrating a reference wave form and a current wave form generated from a spectral output signal from the array of FIG. 1;

FIG. 3 is a graph illustrating the phase shift with respect to temperature for the birefringent sensor of FIG. 1;

FIG. 4 is a graph illustrating cross-correlation of the phase difference between the reference wave form and a current wave form; and FIG. 5 is graph illustrating a dominant frequency and phase for the cross-correlation of the reference and current wave form of FIG. 2.

Figure 1:
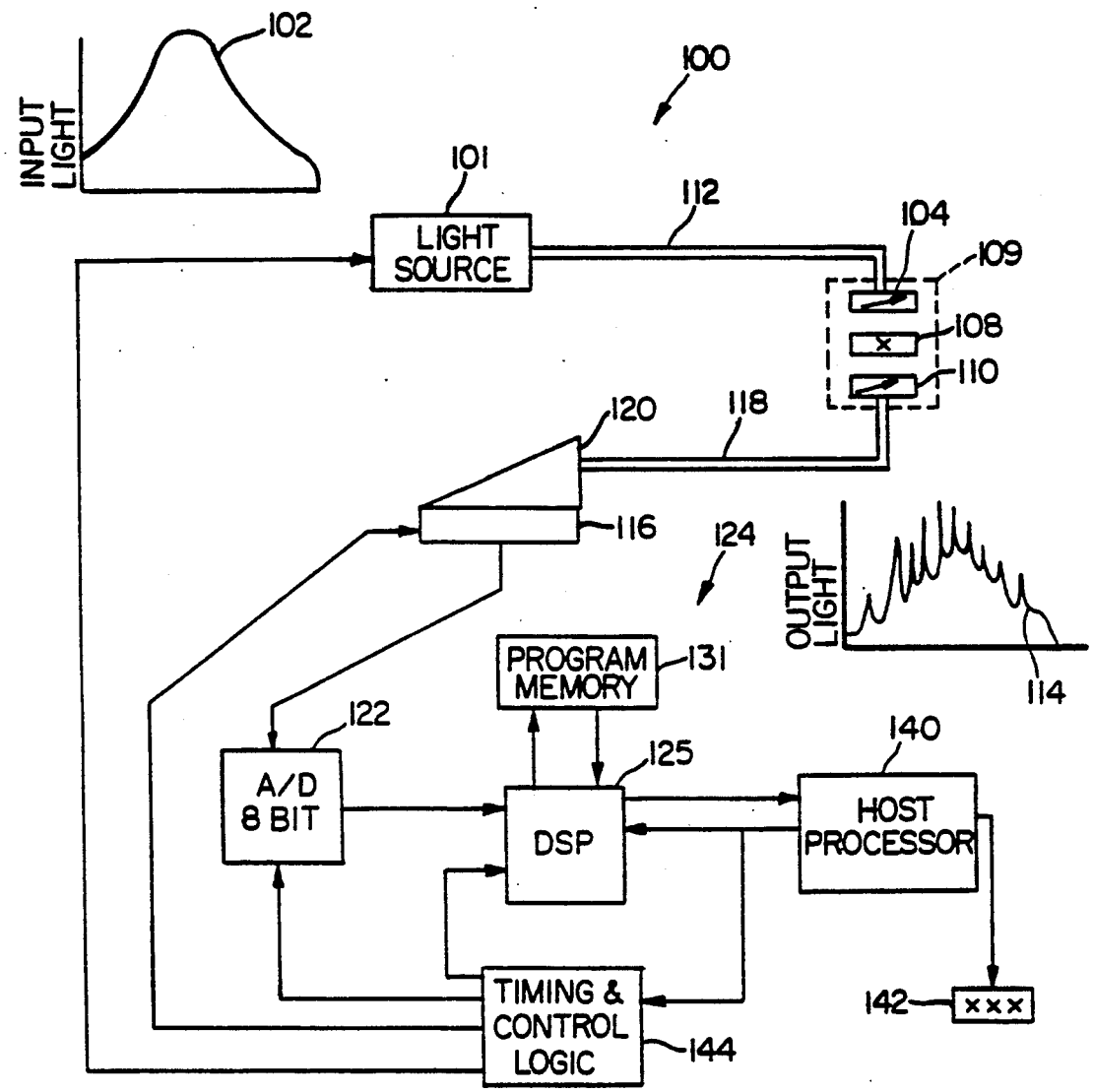
FIG. 1 is a schematic illustration of an spectrometer system which uses a birefringent sensor to obtain a spectral signal supplied to an array from which a current temperature of a sensor is obtained by analyzing changes in a fringe pattern according to a process disclosed by the current invention.

FIG. 1 illustrates an spectrometer system 100 wherein excitation broad band spectrum light from a light emitting diode 101 has a bandwidth of 50 nm and spectral content as illustrated by curve 102. Light is communicated by fiber optic cable 112 to a sensor 109 made up of a first polarizer 104, a birefringent element 108 and a second polarizer 110. The first polarizer 104 orients the polarization vector of the light before being presented to a birefringent element 108. The birefringent element 108 which is made of a lanthanum beryllate crystal orientated with its optic axis ideally at a 45° angle relative to the first 104 and second 110 polarizing elements, is compatible with the operational temperature of the desired use for this spectrometer system 100. The optic excitation of the polarized light is spectrally modulated by the birefringent element 108 as a function of induced temperature and stress in the environment in which the birefringent element 108 is located. The modulation of the light by the birefringent element 108, which resembles a fringe pattern such as illustrated by curve 114, is caused by the constructive and destructive interference of the optic excitation of the light emitting diode 101 by a signal from the timing and control logic controller 144 when passed through a second polarizer 110 before being communicated by fiber optic cable 118 to a prism 120 which disperses and focuses the modulated light onto an array of photo-detectors 116. The array of photo-detectors, or a charge couple device (CCD) 116, of which there are 256 individual pixels, responds to the intensity of the dispersed light to produce a spectral output signal which is communicated to an analyzer system 124.

The spectral output signal from array 116 is communicated to an 8-BIT analog to digital converter 122 where the output spectral signal is converted from an analog to a digital signal and communicated to a digital signal processor 125 to generate a reference wave form 128 as shown in FIG. 2, by exposing the birefringent element to a known temperature (20° C.). The dominant frequency d(f) of the reference wave form 128 is obtained in the digital signal processor 125 performing a Fourier Transformation upon the reference wave form 128. This transformation is consistent with the following digital Fourier Transformation formula:

$$X(k) = \sum_{n=0}^{N-1} x(n) e^{-j2\pi nk/N}$$

k is a selected entry point or index of the resultant of the Fourier Transformation of the spectral scan;
N is number of sample points of window "w" such as shown in FIG. 3; and
n is the summation index, from 0 to N−1.

The reference wave form 128 and its dominant frequency d(f) are stored in the memory 131 associated with the digital signal processor 125.

It is known that frequency of an output signal generated by a birefringent element changes about 1% for every 100° C. however the phase of the multiple cycle fringe pattern changes approximately 1° for each 1° C. change. Thus, a complete cycle of the phase occurs with every 360° C. change in temperature as illustrated by curve 134 in FIG. 3, for example, a phase shift of −180° can represent −359°, 0°, +359°, +719° C. The ambiguity in the phase/temperature relationship is resolved by the dominant frequency. The Phase shift for the birefringent element 108 when exposed to known temperature (20° C.) is illustrated by curve 133 in FIG. 5. The phase shift and the dominant frequency experienced by an spectral output signal for birefringent element 108 was obtained for each ° C. and stored in the memory 131 of the digital signal processor 125.

In the process of determining temperature by the analyzer system 124, both phase and frequency information obtained from a current multiple cycle fringe pattern produced when the birefringent element 108 is exposed to an unknown temperature are compared with stored reference phase and dominant frequency information to predict the unknown temperature in the following manner. Birefringent element 108 is exposed to an unknown temperature and the light from the light emitting diode after passing through polarizer 110 is communicated to detector array 116. The output spectral signal from array 116 is converted from an analog to a digital signal by the 8-BIT converter 122 and communicated to the digital signal processor 125 to establish a current wave form 126 as shown in FIG. 2.

Using the following cross-correlation formula:

$$C_{xy}(m) = \frac{1}{N} \sum_{n=0}^{N-1} x(n) y(n+m)$$

where
m is the entry index for the resultant Fourier Transformation of the spectral scan;
N is number of sample points;
n is the summation index, from 0 to N−1;
x () is the signal for the reference wave form; and
y () is the signal for the current wave form, the resulting cross correlation of curves 126 and 128 is illustrated by curve 130 in FIG. 4. Thereafter, a Fast Fourier Transformation is performed the correlating curve 130 to obtain the dominant frequency illustrated by curve 132 in FIG. 5 for the current phase and frequency relationship shown by curve 133. As shown in FIG. 5, the phase information extracted is at point T.

The dominant frequency of the current wave form is compared with the dominant frequency of the reference wave form previously stored in memory 131 of the digital signal processor 125 to determine the temperature for the phase difference of the current and reference wave form.

Thereafter, the temperature range for the measured phase is selected from the dominant frequency curve 132 and is matched with a reference information or table in the memory 131 of digital signal processor 125 to determine the current temperature of the birefringent element 108. The current temperature as determined in the digital signal processor 125 is communicating to an operational control or host computer 140 to provide an indication of the current temperature of the environment in which the birefringent element 108 is located. The current temperature is displayed on a screen 142 to visually inform an operator of the operational conditions experienced by the birefringent element 108.

The digital signal processor 125 and 8-BIT convertor 122 are all controlled by a common timing and logic control 144 that receives an input from the main or host computer 140. The digital signal processor 125 receives an input operational signal to read the current wave form 128 from the photodetector array 116. The timing of the processing of a current wave form from the photodetector array 116 may vary from submilliseconds to several milliseconds depending on the location and function observed by birefringent element 108 to keep the main or host computer 140 informed of the changes in temperature experienced by the birefringent element 108.

We claim:

1. A process for analyzing a plurality of multiple period spectrally modulated signals generated by a birefringent element and transmitted to an array, comprising the steps of:
    establishing a reference wave form from an output of said spectrally modulated signals emanating from said array in response to the birefringent element being exposed to a known temperature, said reference wave form having a dominant frequency and initial phase;
    storing said reference wave form;
    sampling said output spectrally modulated signals emanating from said array to establish a current wave form;
    extracting a phase and frequency relationship between the current wave form and the reference wave form by cross correlating the current wave form and reference wave form;
    performing a Fourier Transformation to determine the phase of the dominant frequency for said extracted phase and frequency relationship;
    comparing said dominant frequency of said extracted phase and frequency relationship with said dominant frequency of said reference wave form to establish the temperature range for said extracted phase; and
    matching said temperature range and phase with a reference schedule to determine the current temperature of the birefringent element.

2. The process for analyzing the plurality of multiple period spectrally modulated signals as recited in claim 1 further including the step of:
    periodically selectively sampling the output current wave form to continually monitor changes of the temperature of the birefringent element in an unknown temperature environment.

3. The process for analyzing the plurality of multiple period spectrally modulated signals as recited in claim 1 further including the step of:
    displaying said current temperature on a screen to inform an operator of the operation conditions experienced by the birefringent element.

4. The process for analyzing the plurality of multiple period spectrally modulated signals as recited in claim 1 further including the step of:
    limiting the evaluation of the current wave form to a portion of the cross correlation.

5. A process for analyzing a plurality of multiple period spectrally modulated signals generated by a birefringent element and transmitted to an array, comprising the steps of:
    converting first output of said multiple period spectrally modulated signals from said array from an analog to a digital signal to establish a reference wave form, said reference wave form being generated when said birefringent element is exposed to a known temperature, said reference wave form having a phase and dominant frequency;
    storing said phase and dominant frequency for said reference wave form and said reference wave form in the memory of a digital signal processor;
    converting second output of said multiple period spectrally modulated signals from said array from an analog to a digital signal to establish a current wave form;
    extracting an unknown phase and frequency relationship between the current wave form and the reference wave form by performing a cross correlation of the current wave form and reference wave form in the digital signal processor and performing a Fourier Transformation on said cross correlation to determine the dominant frequency and phase of said unknown phase and frequency; and
    comparing said unknown dominant frequency with said stored dominant frequency to establish the temperature range for said unknown phase;
    matching said unknown temperature range and phase with a reference table in said digital signal processor to determine the current temperature of the birefringent element; and
    selectively communicating said current temperature of said birefringent element to an operational control.

6. The process for analyzing the plurality of multiple period spectrally modulated signals as recited in claim 5 further including the step of:
    periodically reading said current wave form to maintain a continuous observation of changes in temperature experienced by said birefringent element.

7. The process for analyzing the plurality of multiple period spectrally modulated signals as recited in claim 5 further including the step of:
    displaying the current temperature on a screen to inform an operator of the operational conditions experienced by the birefringent element.

8. A process for analyzing a plurality of multiple period spectrally modulated signals generated by a birefringent element and transmitted to an array, comprising the steps of:
    establishing a reference wave form from a first output of said multiple period spectrally modulated signals emanating from said array in response to the birefringent element being exposed to a known temperature, said reference wave form having a dominant frequency and initial phase;
    storing said dominant frequency and initial phase of said reference wave in a digital processor;
    sampling a second output of said multiple period spectrally modulated signals emanating from said array to establish a current wave form;
    obtaining the dominant frequency and phase for said current wave form; and
    determining the difference in the dominant frequency of the current wave form and the dominant frequency of the reference wave form to establish the temperature range for
    matching said difference between the current phase with a reference phase in a schedule to determine the current temperature of the birefringent element.

* * * * *